(12) United States Patent
Kingsley

(10) Patent No.: US 9,061,196 B2
(45) Date of Patent: Jun. 23, 2015

(54) BOARD GAME

(71) Applicant: Mimi Kingsley, San Francisco, CA (US)

(72) Inventor: Mimi Kingsley, San Francisco, CA (US)

(73) Assignee: Warifu, LLC, San Francisco, CA (US)

( * ) Notice: Subject to any disclaimer, the term of this patent is extended or adjusted under 35 U.S.C. 154(b) by 37 days.

(21) Appl. No.: 13/664,162

(22) Filed: Oct. 30, 2012

(65) Prior Publication Data

US 2013/0072272 A1    Mar. 21, 2013

Related U.S. Application Data

(62) Division of application No. 12/804,562, filed on Jul. 22, 2010.

(51) Int. Cl.
| | | |
|---|---|---|
| G07F 17/32 | (2006.01) | |
| A63F 3/00 | (2006.01) | |
| A63F 3/04 | (2006.01) | |
| A63F 13/00 | (2014.01) | |

(52) U.S. Cl.
CPC .............. *A63F 3/00* (2013.01); *A63F 3/00643* (2013.01); *A63F 3/0415* (2013.01); *A63F 2003/00258* (2013.01); *A63F 2003/00955* (2013.01); *A63F 13/005* (2013.01)

(58) Field of Classification Search
USPC ........................................ 463/9; 273/271–272
See application file for complete search history.

(56) References Cited

U.S. PATENT DOCUMENTS

| | | | | |
|---|---|---|---|---|
| 1,377,366 | A * | 5/1921 | Rose .............................. | 396/472 |
| 3,165,318 | A * | 1/1965 | Lissandrello ................. | 273/272 |
| 3,342,493 | A * | 9/1967 | Lang ............................. | 273/271 |
| 3,545,101 | A | 12/1970 | Fike | |
| RE29,355 | E | 8/1977 | Lefevre et al. | |
| 4,548,410 | A * | 10/1985 | Morrone ..................... | 273/153 S |
| 4,776,597 | A | 10/1988 | Rudell | |
| 5,301,952 | A * | 4/1994 | Fitzgerald ..................... | 273/269 |
| 5,478,087 | A | 12/1995 | Dumisani | |
| 5,497,998 | A | 3/1996 | Horton | |
| 5,560,612 | A * | 10/1996 | Ippoliti et al. ................ | 273/272 |
| 6,695,618 | B2 | 2/2004 | Donn | |
| 7,219,895 | B1 | 5/2007 | Hutchins, Jr. | |
| 2006/0261548 | A1 * | 11/2006 | Casanova ..................... | 273/236 |
| 2007/0235929 | A1 | 10/2007 | Nip | |

OTHER PUBLICATIONS

Official Tournament Rules released by the North American SCRABBLE Players Association 02.02.10, Section IV.E.1.

* cited by examiner

*Primary Examiner* — Tramar Harper
(74) *Attorney, Agent, or Firm* — Reed Smith LLP

(57) ABSTRACT

A board game that combines the traditional Asian counting system of tally marks; basic addition skills; vertical and horizontal tracking of tally numeral combinations; and strategic sequential placement of same-color Game Tiles is disclosed. Generally, the goal is to place five same-color game tiles in a sequential row or column—and have their collective tally sum equal to the white tally numeral on the black tiles that flank both ends of the sequential row or column. The first person or team to place five same-color game tiles in a sequential row or column—and have their collective tally sum equal to the white tally numeral on the black tiles that flank both ends of the sequential row or column—is the winner of the game. The winner is the first person or team to win three games.

6 Claims, 11 Drawing Sheets

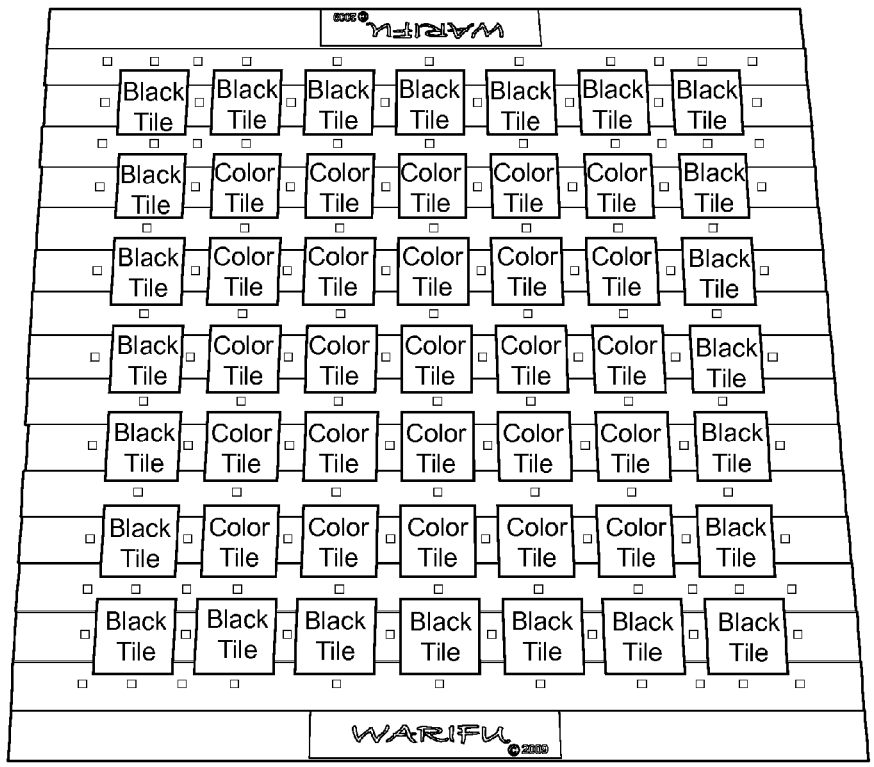
FIG. 3A
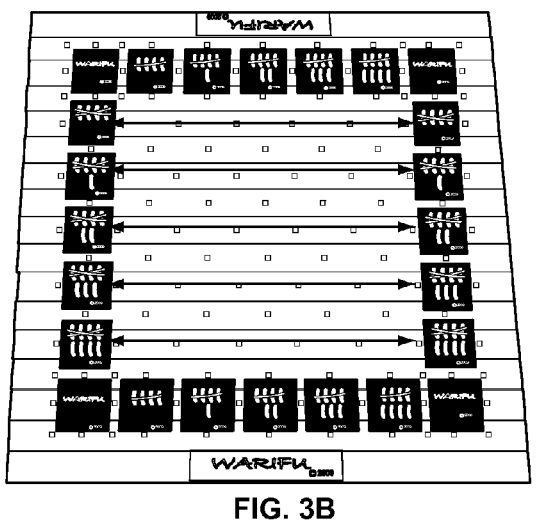 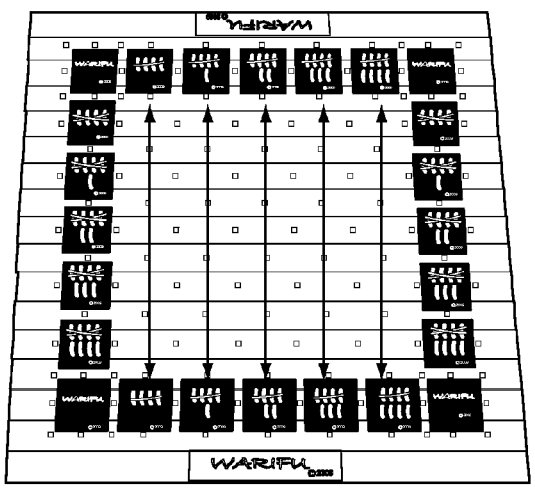
FIG. 3B  FIG. 3C

EASY:

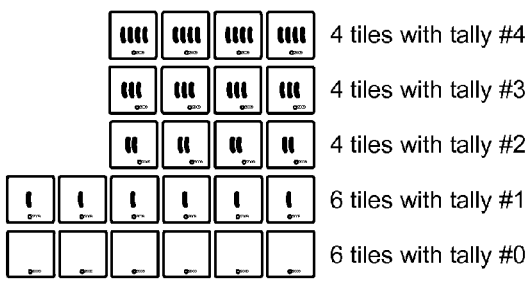

4 tiles with tally #4
4 tiles with tally #3
4 tiles with tally #2
6 tiles with tally #1
6 tiles with tally #0

FIG. 5A

CHALLENGING:

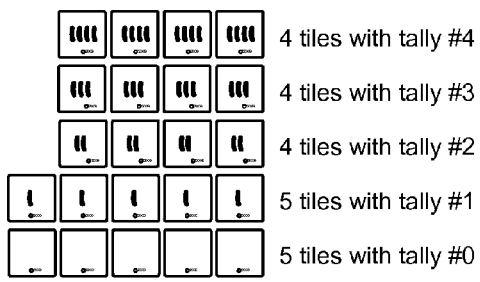

4 tiles with tally #4
4 tiles with tally #3
4 tiles with tally #2
5 tiles with tally #1
5 tiles with tally #0

FIG. 5B

DIFFICULT:

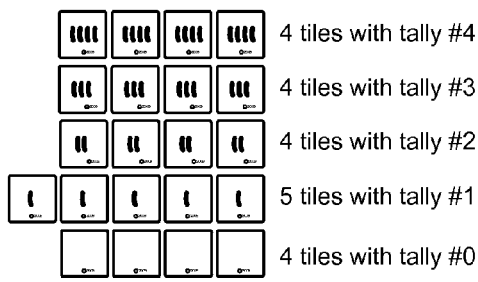

4 tiles with tally #4
4 tiles with tally #3
4 tiles with tally #2
5 tiles with tally #1
4 tiles with tally #0

FIG. 5C

COMPLEX:

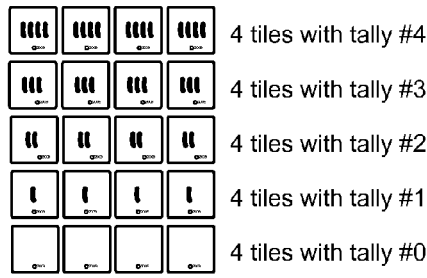

4 tiles with tally #4
4 tiles with tally #3
4 tiles with tally #2
4 tiles with tally #1
4 tiles with tally #0

FIG. 5D

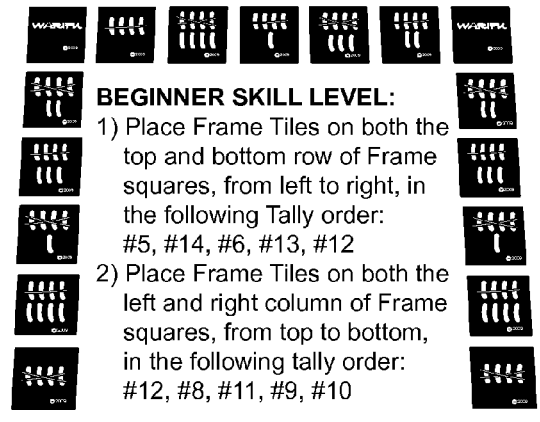

BEGINNER SKILL LEVEL:
1) Place Frame Tiles on both the top and bottom row of Frame squares, from left to right, in the following Tally order: #5, #14, #6, #13, #12
2) Place Frame Tiles on both the left and right column of Frame squares, from top to bottom, in the following tally order: #12, #8, #11, #9, #10

FIG. 5E

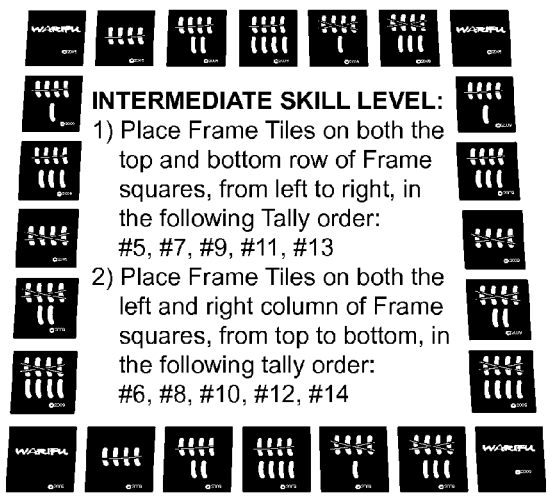

INTERMEDIATE SKILL LEVEL:
1) Place Frame Tiles on both the top and bottom row of Frame squares, from left to right, in the following Tally order: #5, #7, #9, #11, #13
2) Place Frame Tiles on both the left and right column of Frame squares, from top to bottom, in the following tally order: #6, #8, #10, #12, #14

FIG. 5F

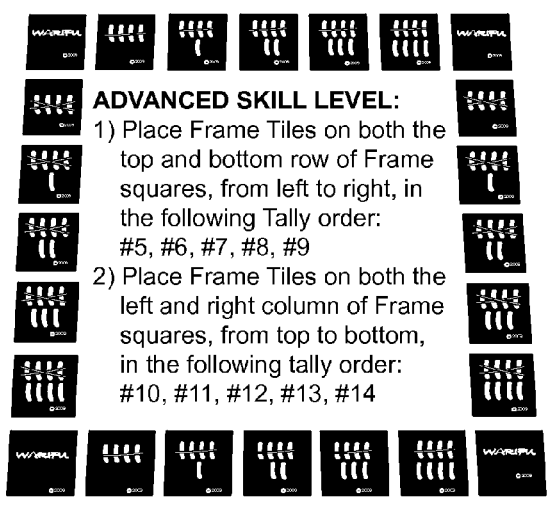

ADVANCED SKILL LEVEL:
1) Place Frame Tiles on both the top and bottom row of Frame squares, from left to right, in the following Tally order: #5, #6, #7, #8, #9
2) Place Frame Tiles on both the left and right column of Frame squares, from top to bottom, in the following tally order: #10, #11, #12, #13, #14

FIG. 5G

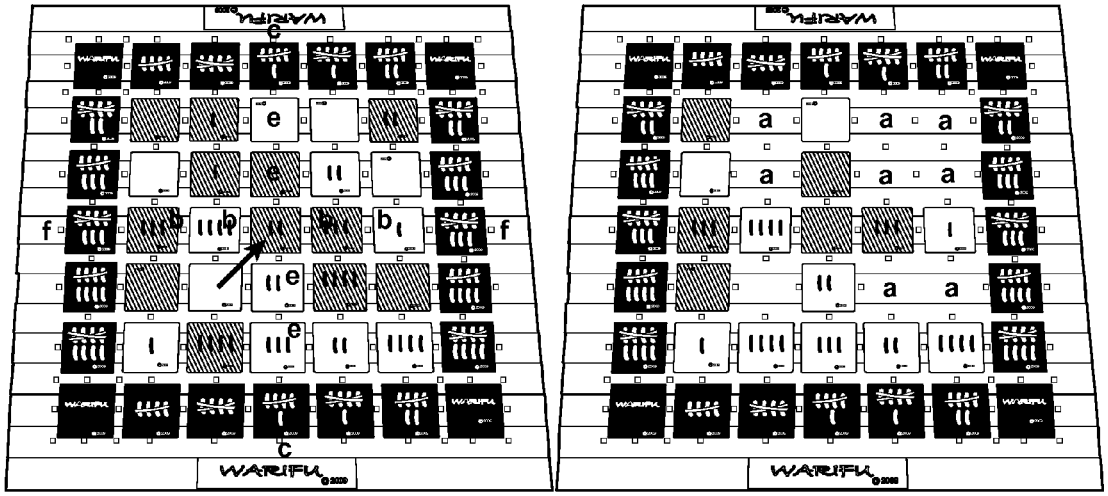
FIG. 6A
FIG. 6C
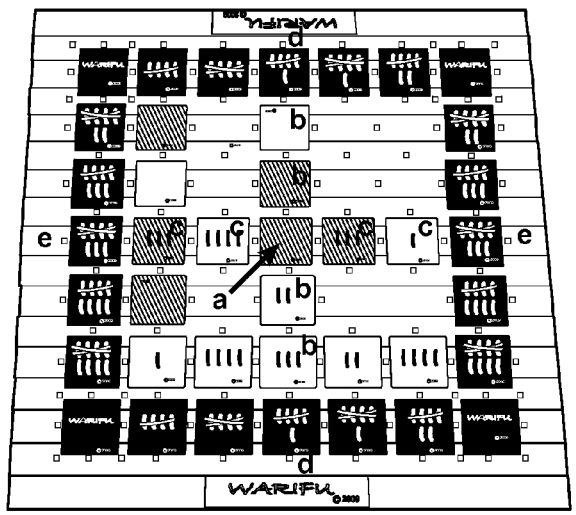
FIG. 6B
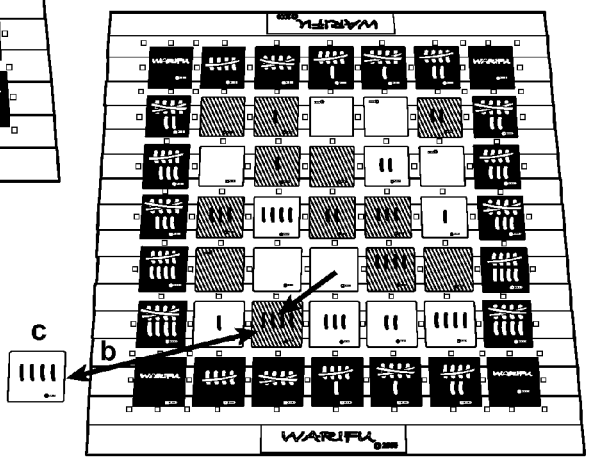
FIG. 6D

BOARD GAME

CROSS-REFERENCE TO RELATED APPLICATION

This is a Divisional of U.S. patent application Ser. No. 12/804,562, filed Jul. 22, 2010 entitled Board Game.

BACKGROUND OF THE INVENTION

1. Field of the Invention

The present invention relates generally to a board game, and more particularly to a tile-based multi-player board game that may be implemented as a physical board game or an electronic game.

2. Description of the Related Art

Various board games used for entertainment and educational purposes are well known. Some board games are games of chance, while others require the players to utilize skills or strategy to win. In addition, games utilizing components having number or indicia are known, such as dice, dominoes, etc.

SUMMARY OF THE INVENTION

In general, the present invention is a board game is called WARIFU™ (Japanese for "tally"), that combines the traditional Asian counting system of tally marks; basic addition skills; vertical and horizontal tracking of tally numeral combinations; and strategic sequential placement of same-color Game Tiles.

In a preferred embodiment, the goal of WARIFU™ is to place five same-color game tiles in a sequential row or column—and have their collective tally sum equal to the white tally numeral on the black tiles that flank both ends of the sequential row or column. The center of the Game Board has a total of 25 squares (five rows and five columns of five squares each) providing 10 options for players to make a winning combination of five sequential same-color game tiles. Players take turns, one at a time moving clockwise around the table, placing one colored game tile on one Game Board square, simultaneously blocking their opponents game play options while increasing their strategic advantage (see Game Play instructions below). The first person or team to place five same-color game tiles in a sequential row or column—and have their collective tally sum equal to the white tally numeral on the black tiles that flank both ends of the sequential row or column—is the winner of the game. The WARIFU™ Champion is the first person or team to win three games.

More particularly, according to one embodiment of the present invention, a game comprises a game board having a plurality of playing squares arranged in rows and columns; a plurality of Frame Tiles, wherein a Frame Tile is placed on at least one end of each row and each column, each Frame Tile comprising an indicia of a numeral; a plurality of Game Tile sets, each Game Tile comprising an indicia of a numeral, and each player having a set of Game Tiles; wherein each player places a Game Tile from his/her set in one of the playing squares on the game board with the goal that the player's Games Tiles fill every playing square in a row or column and a sum of the indicia of numerals on the player's own Game Tiles in either a row or column equals the indicia of a numeral on a Frame Tile at an end of either the row or column. Additionally, a Frame Tile may be placed on both ends of each row and each column, such that a Frame Tile placed on a first end of a row has a same indicia of a numeral as a Frame Tile placed on an opposite end of the row, and wherein a Frame Tile placed on a first end of a column has a same indicia of a numeral as a Frame Tile placed on an opposite end of the column.

According to another embodiment of the present invention, the game comprises a game board comprising 49 squares arranged in 7 rows and 7 columns, with four Corner Squares, 20 Frame Squares on a perimeter of the game board, and 25 Center Squares; a plurality of Frame Tiles, wherein a Frame Tile is placed on each end of each row and each column in a Frame Square, each Frame Tile comprising an indicia of a numeral from 5 to 14, inclusive, such that a Frame Tile placed on a first end of a row has a same indicia of a numeral as a Frame Tile placed on an opposite end of the row, and wherein a Frame Tile placed on a first end of a column has a same indicia of a numeral as a Frame Tile placed on an opposite end of the column; four Corner Tiles, each Corner Tile placed on one Corner Square; a plurality of Game Tiles, each Game Tile comprising an indicia of a numeral from 0 to 4, inclusive; wherein each player places a Game Tile in one of the center playing squares on the game board in a manner such that a sum of the indicia of numerals on the player's own Game Tiles in either a row or column equals or is less than the indicia of a numeral on a Frame Tile at an end of either the row or column.

A method of playing a board game according to the present invention comprises on a game board having a plurality of squares arranged in rows and columns, placing a Frame Tile, each Frame Tile having an indicia of a numeral, at an end of each row and each column before game play; assigning a unique set of Game Tiles to each player or team; each player or team in turn placing a Game Tile from the unique set on a playing square, each Game Tile having an indicia of a numeral wherein a first player or team to place its Game Tiles completely filling the playing squares in a row or column, such that a sum of the indicia of numerals on the Game Tiles in an intersecting row or column equals the indicia of a numeral on the Frame Tile at an end of the row or column, wins the game.

The present invention may also be implemented as a computer or electronic game. Accordingly, in one embodiment of the present invention a computer readable medium comprises computer code for forming a game board having a plurality of playing squares arranged in rows and columns; computer code for creating a plurality of Frame Tiles, wherein a Frame Tile is placed on at least one end of each row and each column, each Frame Tile comprising an indicia of a numeral; computer code for creating a plurality of Game Tile sets, each Game Tile comprising an indicia of a numeral, and each player having a set of Game Tiles; and computer code to allow each player to place a Game Tile from his/her set in one of the playing squares on the game board with the goal that the player's Games Tiles fill every playing square in a row or column, and a sum of the indicia of numerals on the player's own Game Tiles in either a row or column equals the indicia of a numeral on a Frame Tile at an end of either the row or column.

An electronic game system for playing an electronic game comprises a processor for executing program code instructions; a computer readable medium storing computer code instructions, the computer code instructions comprising computer code instructions for forming a game board having a plurality of playing squares arranged in rows and columns; computer code instructions for creating a plurality of Frame Tiles, wherein a Frame Tile is placed on at least one end of each row and each column, each Frame Tile comprising an indicia of a numeral; computer code instructions for creating a plurality of Game Tile sets, each Game Tile comprising an indicia of a numeral, and each player having a set of Game Tiles; and computer code instructions to allow each player to place a Game Tile from his/her set in one of the playing squares on the game board with the goal that the player's Games Tiles fill every playing square in a row or column, and a sum of the indicia of numerals on the player's own Game Tiles in either a row or column equals the indicia of a numeral on a Frame Tile at an end of either the row or column.

BRIEF DESCRIPTION OF THE DRAWINGS

The present invention will be readily understood by the following detailed description in conjunction with the accompanying drawings, in which:

FIG. 3A illustrates the placement of colored Game Tiles and Frame Tiles on the game board squares;

FIG. 3B illustrates the placement of Black Frame Tiles on the rows;

FIG. 3C illustrates the placement of Black Frame Tiles on the columns;

FIG. 5A illustrates an Easy Game Tile Chart;

FIG. 5B illustrates a Challenging Game Tile Chart;

FIG. 5C illustrates a Difficult Game Tile Chart;

FIG. 5D illustrates a Complex Game Tile Chart;

FIG. 5E illustrates a Beginner Frame Tile Chart;

FIG. 5F illustrates an Intermediate Frame Tile Chart;

FIG. 5G illustrates as Advanced Frame Tile Chart;

FIG. 6A illustrates an incorrect Move during game play;

FIG. 6B illustrates a Correct Move during game play;

FIG. 6C illustrates an Empty Board Move game rule during game play;

FIG. 6D illustrates a Full Board Move game rule during game play;

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

Board Game Overview

Figure 1A:
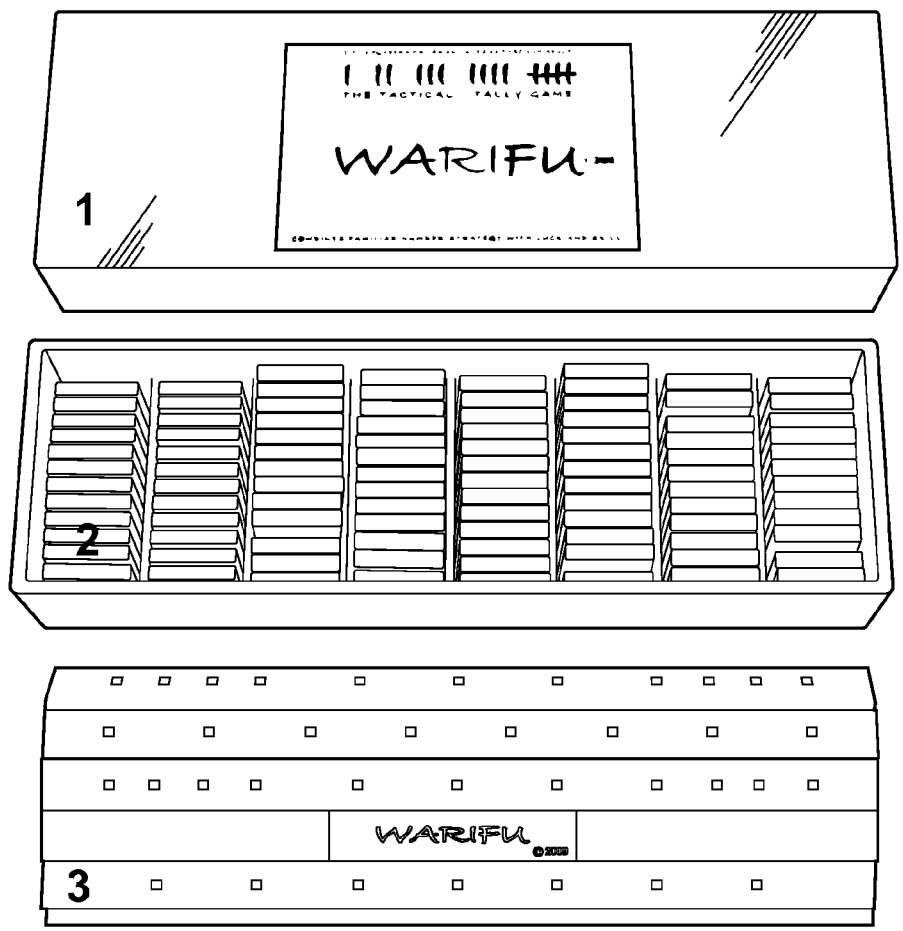
FIG. 1A illustrates the basic game components and packaging according to an embodiment of the present invention.

The present board game is called WARIFU™ (Japanese for "tally") and is a Japanese-influenced board game (FIG. 1) that combines the traditional Asian counting system of tally marks; basic addition skills; vertical and horizontal tracking of tally numeral combinations; and strategic sequential placement of same-color Game Tiles. The game will described herein in view of a particular preferred embodiment, however it is understood that within the rules and parameters of the game described herein, the specific storage box game board, game pieces, etc. may be modified as desired. According to the preferred embodiment, WARIFU™ uses a black bamboo-slatted mat as the game board (FIGS. 1A, 1C); unique square-shape solid-colored tiles with recessed tally marks as the game pieces (FIG. 1B); and a Japanese-inspired black treasure box to store the game components (FIG. 1A).

Figure 7A:
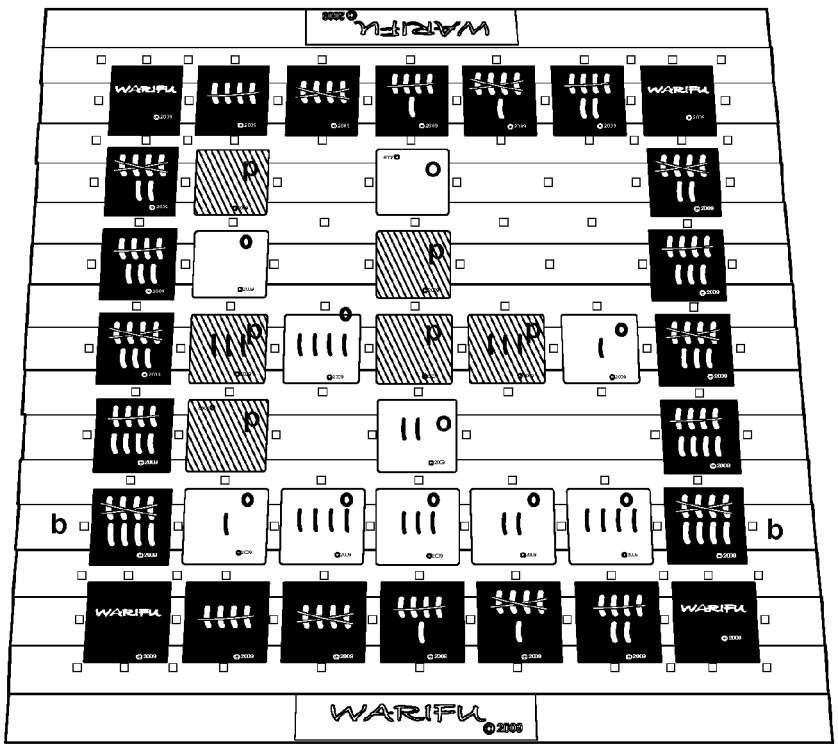
FIG. 7A illustrates a Winning Move during game play.

The goal of WARIFU™ is to place five same-color game tiles in a sequential row or column—and have their collective tally sum equal to the white tally numeral on the black tiles that flank both ends of the sequential row or column (FIG. 7A). The center of the Game Board has a total of 25 squares (five rows and five columns of five squares each) providing 10 options for players to make a winning combination of five sequential same-color game tiles, as illustrated in FIG. 2. Players take turns, one at a time moving clockwise around the table, placing one colored game file on one Game Board square, simultaneously blocking their opponents game play options while increasing their strategic advantage (see Game Play instructions below). The first person or team to place five same-color game tiles in a sequential row or column—and have their collective tally sum equal to the white tally numeral on the black tiles that flank both ends of the sequential row or column—is the winner of the game (FIG. 7A). The WARIFU™ Champion is the first person or team to win three games.

WARIFU™ can be played with 2 to 3 players, 2 to 3 pairs of players (teams), and an odd or even number of players. The game is recommended for players ages 12 and older. Minimal game expertise or skills are required, only; simple counting and addition of tally numerals; vertical and horizontal tracking of tally numerals; and sequential placement of same-color game tiles. WARIFU™ can be customized for beginner, intermediate and advanced player skill levels; the numeric combination of tally game tiles players use during game play impacts a player's game strategy and ease of ability to win a game (FIGS. 5A-5D); the location of the matching white tally numerals that flank both ends of each column and row on the game board border has a direct impact on the game's ease of playability (FIGS. 5E-5G).

The game's ease of playability, the combination of luck and skill in game play strategy, and the option to play with either odd or even number of players makes it an inclusive and fun source of entertainment. While the game is described herein using standard physical board game components, the WARIFU™ Board Game can also be made into an interactive electronic game, computer game or as a cell phone application, with players competing against the electronic device or online against other players. WARIFU™ play transcends language barrier as there are no words used on any of the game components and no words that have to be read as part of game play. Only the game play instruction sheet needs to be translated. WARIFU™'s tally numerals and simple counting system are easily interpreted by different cultures.

DETAILED DESCRIPTION OF THE FIGURES

Figure 1B:
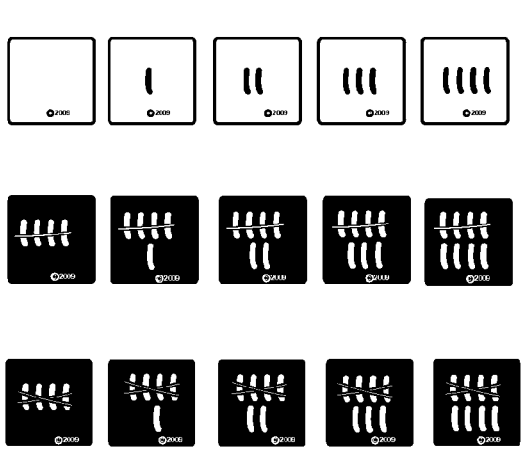
FIG. 1B illustrates unique square-shape game tiles with recessed tally numerals from 0 to 14.
Figure 1C:
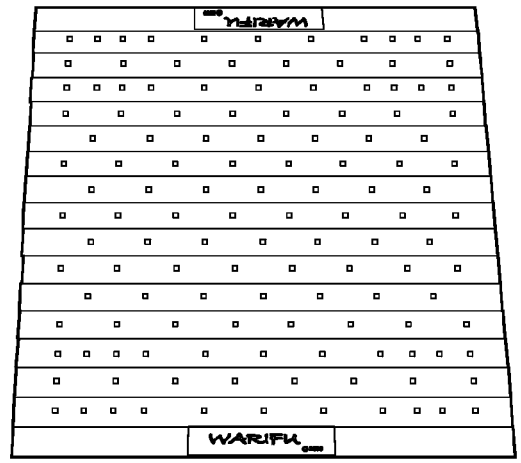
FIG. 1C illustrates a black bamboo-slated game board mat, unrolled flat.

One embodiment of the present invention will be described in detail below with respect to the accompanying figures. An introductory description of each figure is provided herein:

FIG. 1A illustrates the Game Box lid 1, which lifts off to reveal the game components inside the Game Box. Twenty black Frame tiles, three sets of three colored Scoring Tiles, and three sets of twenty-four colored Game Tiles are stored in compartments in the base 2 of the Game Box. The Game Board 3 is rolled-up for compact storage and placed on top of the Game Tiles inside the Game Box. FIG. 1B shows the unique square-shaped Game Tiles with recessed tally numerals from 0 to 14. FIG. 1C illustrates the black bamboo-slated Game Board Mat unrolled flat for use.

Figure 2A:
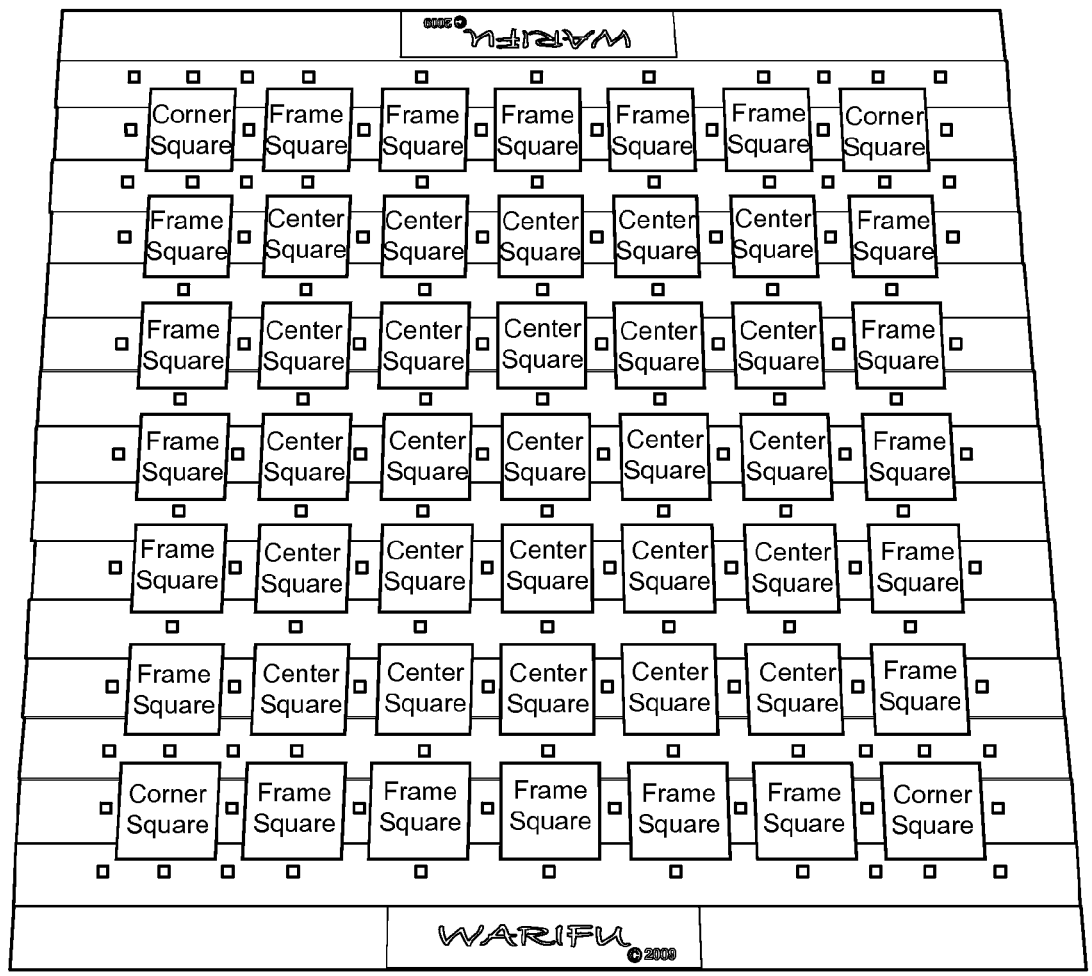
FIG. 2A illustrates the Game Board Mat with Corner Squares, Frame Squares, and Center Squares.
Figure 2B:
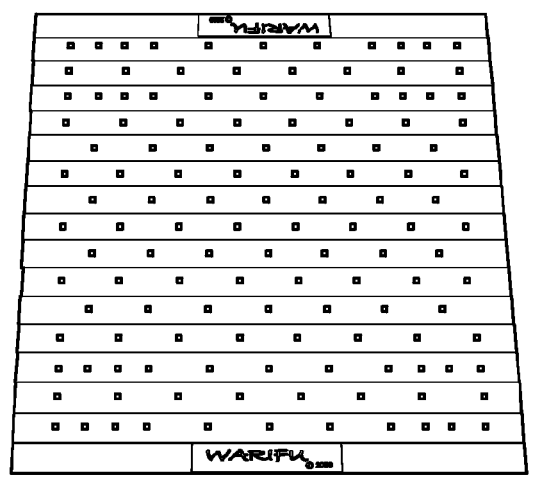
FIG. 2B illustrates the Game Board and the location of the Grid of squares indicated by dots on the game board.

FIG. 2A illustrates the proper placement of the various game tiles on the Game Board Mat. Black Corner Square tiles are placed on the four corner perimeter squares. The tiles are placed on the corners before the game begins. The Frame Squares are the 20 squares on the perimeter of the Game Board grid, not including the corner squares. Black and white Frame Tiles are placed on the Frame Squares before the game begins. Center Squares are the 25 squares enclosed by the Frame Squares. Colored Game Tiles are placed on Center Squares by players during game play. The center area has five columns and five rows of five squares each. Each column and row of five squares is flanked at both ends by a Frame Tile with matching tally numerals. FIG. 2B illustrates the Game Board Mat having 49 squares outlined by small raised (purple) blocks on the Game Board, which dictate the placement of the tiles and prevents them from shifting during play.

FIG. 3A illustrates the placement of Colored Game Tiles and Black Frame Tiles on the Game Board squares. The small purple blocks outline the squares where the Black Frame Tiles are placed, and small black blocks outline the squares where the Colored Game Tiles are placed. FIG. 3B illustrates the Black Frame Tile placement on the rows, with matching tally numerals placed at each end of each row. FIG. 3C illustrates the Black Frame Tile placement on the columns, with matching tally numerals placed at each end of each column.

Figure 4A:
FIG. 4A illustrates an example of a Corner Black Tile.

FIG. 4A shows a Corner Tile which are preferably black with the three-colored WARIFU™ name on both sides. Corner Tiles are placed pre-game on the Corner Squares of the Game Board. FIG. 4B illustrates three Scoring Tiles. The Scoring Tiles are preferably colored in three separate sets of: tangerine-orange, violet-purple, and lime-green, all with black borders, and the black WARIFU™ name on both sides. To keep score, the winner of a WARIFU™ game places one of his/her Scoring Tiles on a Corner Square, and stacks an additional Scoring Tile for each additional win. FIG. 4C illustrates a "Wall of Tiles" according to the present game, in which a player places three randomly selected tiles from their Stack on-edge during game play with the tally numerals-side of the tile only visible to the player. FIG. 4D illustrates a "Stack of Tiles", which refers to a player's Game Tiles that have been removed form game play—either by forfeiting a turn or a penalty call—and stacked next to the player one on tip of the other with the tally numeral side up.

Figure 4E:
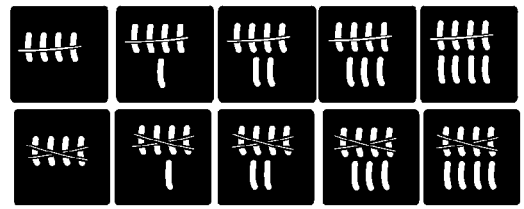
FIG. 4E illustrates the Frame Tiles.
Figure 4B:
FIG. 4B illustrates an example of Scoring Tiles.
Figure 4F:
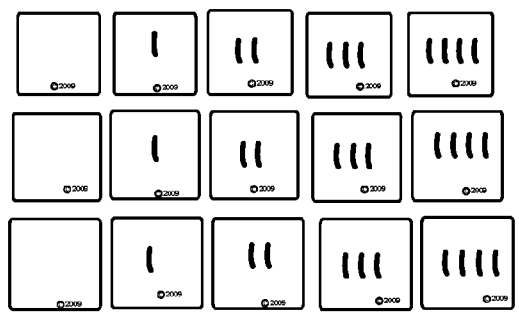
FIG. 4F illustrates the Game Tiles.
Figure 4C:
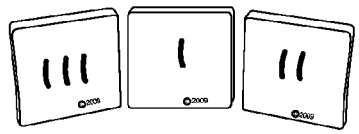
FIG. 4C illustrates a player's Wall of Tiles during game play.
Figure 4G:
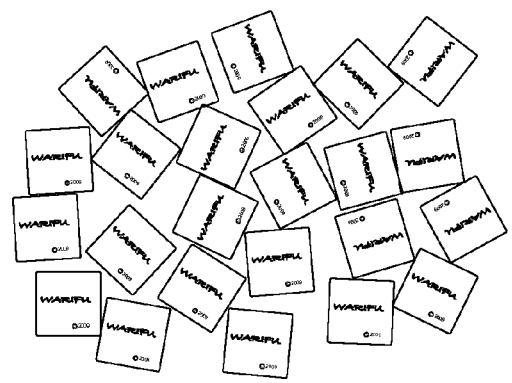
FIG. 4G illustrates a Flat of Tiles.
Figure 4D:
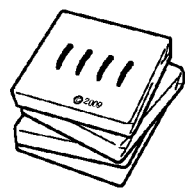
FIG. 4D illustrates a player's Stack of Tiles.

FIG. 4E illustrates Frame Tiles, which are preferably black tiles with white tally numerals. They are placed pre-game on the Frame Squares of the Game Board. FIG. 4F illustrates three sets of game tiles. Each set is a different color, and preferably tangerine-orange, violet-purple and lime-green, with black tally numerals 0 to 4. Each player or team selects one set of colored Game Tiles to use during game play. FIG. 4G illustrates a Flat of tiles, which refers to a player's Game Tiles that they draw from during game play. Pre-game, a player spreads his/her set of colored Game Tiles on a smooth flat surface—tally numeral side down and WARIFU™ name side up, and shuffles.

FIG. 5A illustrates the Game Tile combination for EASY game play (six each of "0" and "1" tiles, and four each of "2", "3" and "4" tiles). FIG. 5B illustrates the Game Tile combination for CHALLENGING game play (five each of "0" and "1" tiles, and four each of "2", "3" and "4" tiles). FIG. 5C illustrates the Game Tile combination for DIFFICULT game play (four each of "0", "2", "3" and "4" tiles, and five "1" tiles). FIG. 5D illustrates the Game Tile combination for COMPLEX game play (four tiles each of "0", "1", "2", "3" and "4").

FIG. 5E illustrates a Beginner Frame Tile Chart. Frame Tiles are placed on both the top and bottom row of the Frame Squares, from left to right, in the following order: #5, #14, #6, #13, and #12. Frame Tiles are placed on the left and right columns of the Frame Squares, from top to bottom, in the following order: #12, #8, #11, #9 and #10.

FIG. 5F illustrates an Intermediate Frame Tile Chart. Frame tiles are placed on both the top and bottom row of the Frame Squares, from left to right, in the following order: #5, #7, #9, #11, and #13. Frame Tiles are placed on the left and right columns of the Frame Squares, from top to bottom, in the following order: #6, #8, #10, #12 and #14.

FIG. 5G illustrates an Advanced Frame Tile Chart. Frame tiles are placed on both the top and bottom row of the Frame Squares, from left to right, in the following order: #5, #6, #7, #8, and #9. Frame Tiles are placed on the left and right columns of the Frame Squares, from top to bottom, in the following order: #10, #11, #12, #13 and #14.

FIG. 6A illustrates an Incorrect Move on the Game Board. An Incorrect Move occurs when a player places a Game Tile on a Center Square (a), and the collective sum of the all the Game Tiles in the intersecting row (b) or column (e) exceeds the white tally numeral on the black tiles that flank both ends of the intersecting row (f) or column (c).

FIG. 6B illustrates a Correct Move on the Game Board. A Correct Move occurs when a player places a Game Tile on a Center Square (a) and the collective sum of all Game Tiles in the intersecting row (c) or column (b) is equal to or less than the white tally numeral on the black tiles that flanks both ends of the intersecting row (e) or column (d).

FIG. 6C illustrates an Empty Board Move Rule. An Empty Board Move Rule applies when there are one or more empty Center Squares (a) on the Game Board. An Empty Board Move occurs when a player places a Game Tile on an empty Center Square (a).

FIG. 6D illustrates a Full Board Move rule. A Full Board Move Rule applies when there are no more empty Center Squares on the Game Board. A Full Board Move occurs when a player removes an opponents Game Tile (a) from one of the Center Squares and replaces (b) it with one of his/her own Game Tiles (c). Opponent's tiles are a different color than a player's game tile.

Figure 7B:
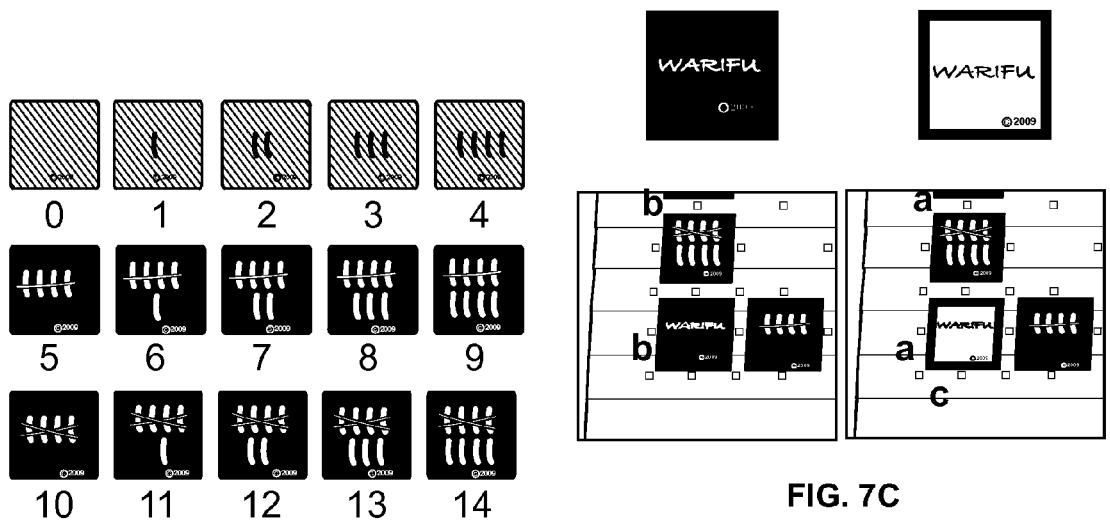
FIG. 7B illustrates a Tally Numeral Tile Chart.
Figure 7C:
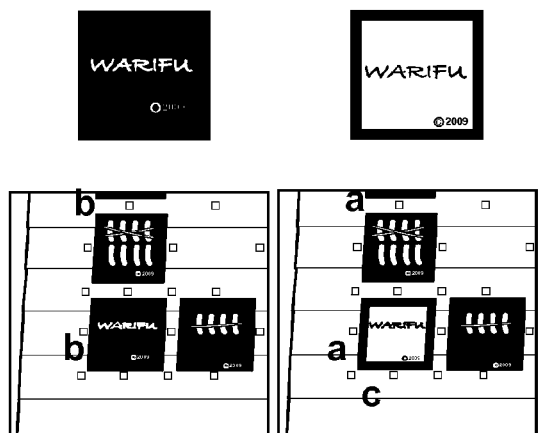
FIG. 7C illustrates Scoring Tile and Corner Tile placement.

FIG. 7A illustrates a Winning Move. A Winning Move occurs when a player places five same-color Game Tiles in a sequential row or column (a) and the collective sum of all Game Tiles in the intersecting row or column equals the white tally numeral (b) that flank both ends of the intersecting row or column ("o" is an orange tile; "p" is a purple tile). FIG. 7B shows the numeric conversion of the tally numeral tiles. FIG. 7C illustrates the placement of a Scoring Tile (a) on top of a designated Corner Tile (b) on the Game Board each time a player wins a game. For multiple wins, a player places his/her Scoring Tile on top of the other Scoring Tile(s) on the same Corner Tile(b).

Figure 8A:
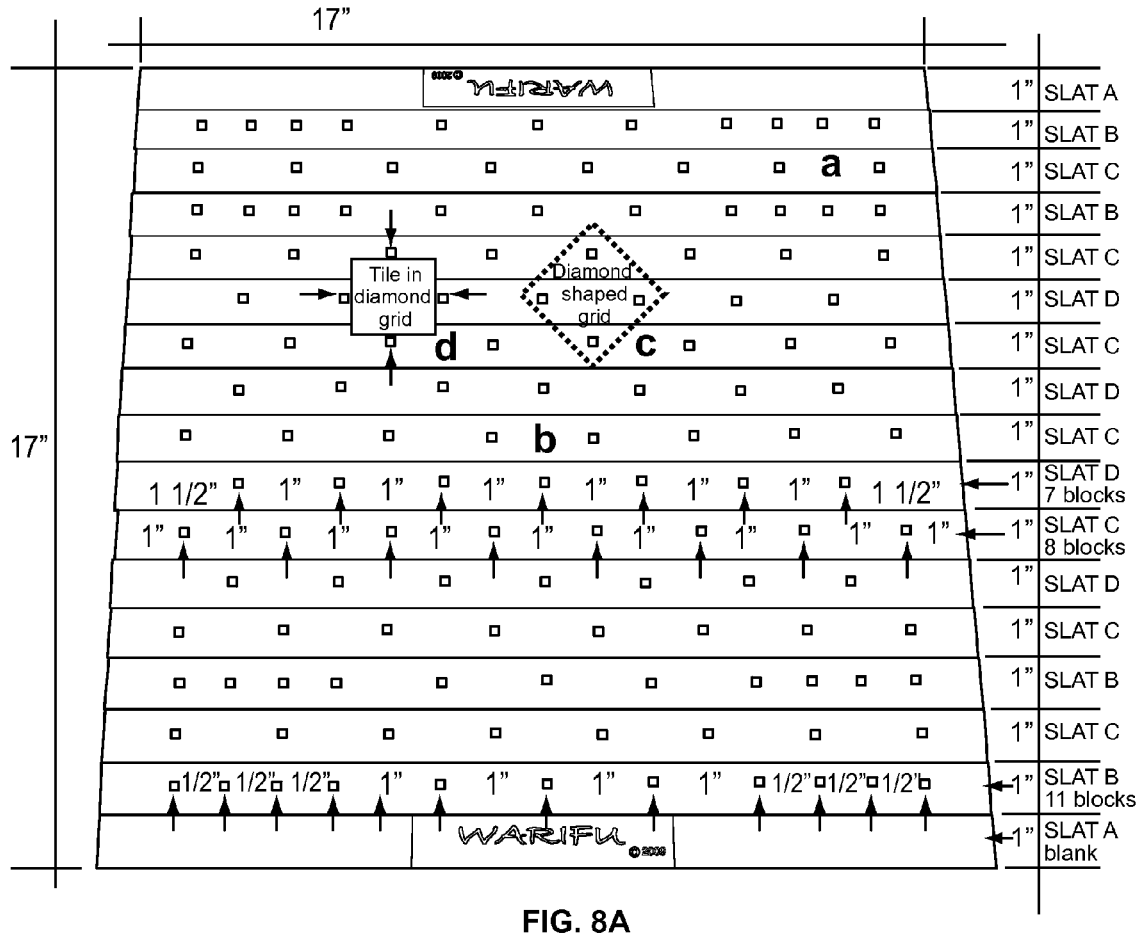
FIG. 8A illustrates the preferred dimensions of a Game Board Mat.
Figure 8B:
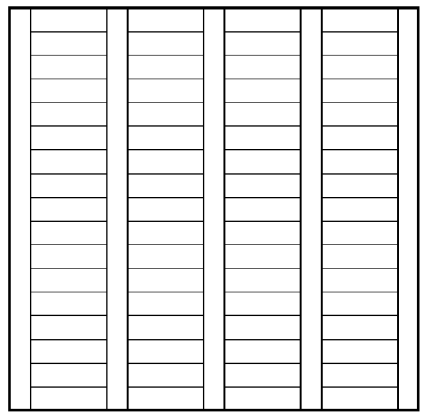
FIG. 8B illustrates the back of a Game Board Mat.
Figure 8C:
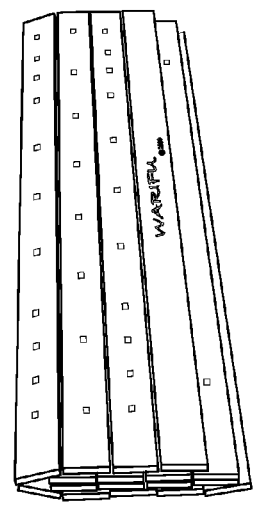
FIG. 8C illustrates the Game Board Mat rolled up.

FIG. 8A illustrates the design and layout of a preferred Game Board. The Game Board is generally square and formed from bamboo or plastic slats. The Game Board surface has a grid of 49 squares, outlined by small blocks (a). The grid is placed in a diamond pattern (c) making it easier for players to pick up the square Game Tiles (d) from their sides. As shown in FIG. 8B, the bamboo or plastic slats are attached together by five strips of sturdy fabric evenly spaced, and running perpendicular to the slats. The strips may be glued to the slats. The Game Board can be rolled-up for easy storage as shown in FIG. 8C.

Figure 9A:
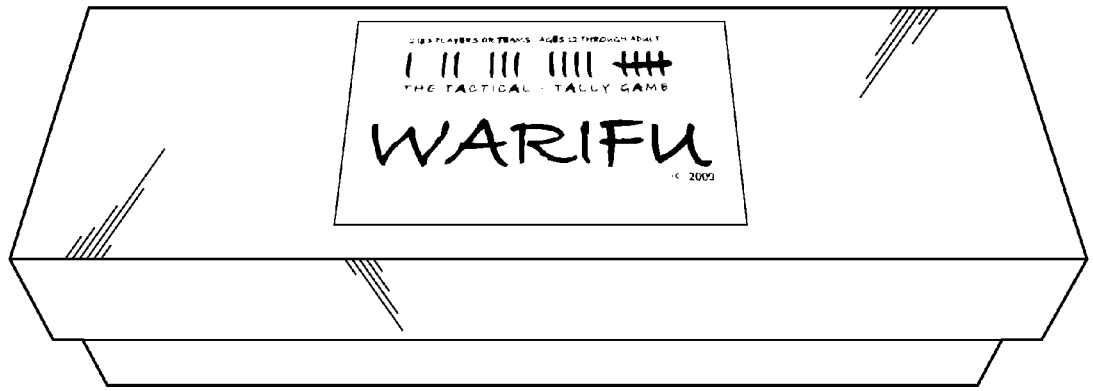
FIG. 9A illustrates a preferred Game Box.
Figure 9C:
FIG. 9C illustrates a side-view of the Game Box.
Figure 9B:
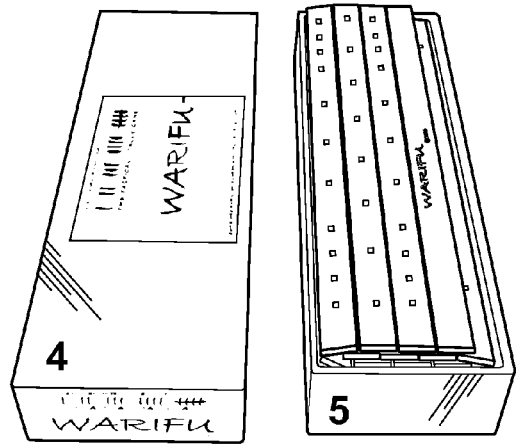
FIG. 9B illustrates the Game Board stored in the Game Box.
Figure 9D:
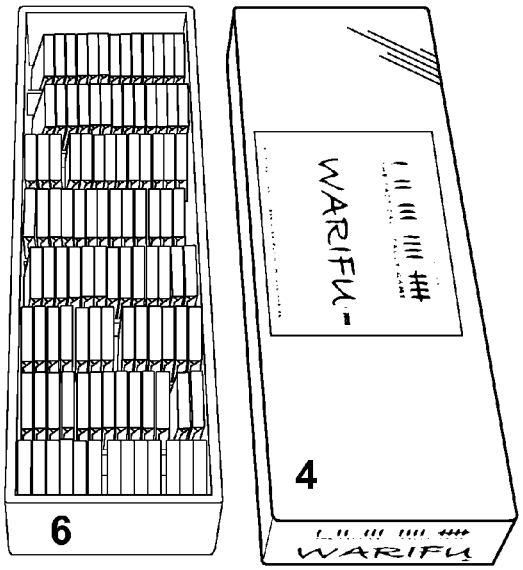
FIG. 9D illustrates the Game Tiles stored in the Game Box.

FIG. 9A shows a preferred game storage box. The Game Box is made of ¼" thick bamboo, and has an overhanging lid (FIG. 9C). The lid 4 can be removed, revealing the Game Board 5, as shown in FIG. 9B. The various game tiles 6 are stored below the Game Board, as shown in FIG. 9D.

Figure 10A:
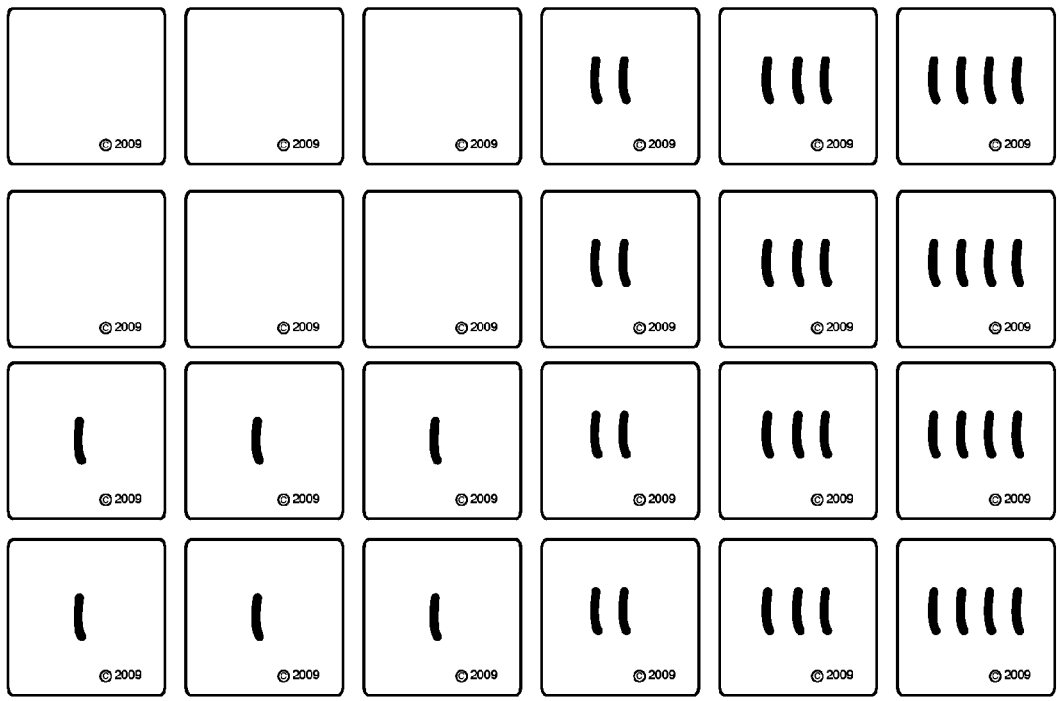
FIG. 10A illustrates a complete set of 24 Game Tiles.
Figure 10B:
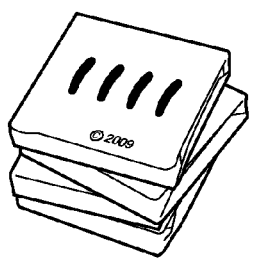
FIG. 10B illustrates the front side of Colored Game Tiles with recessed Tally numerals.
Figure 10D:
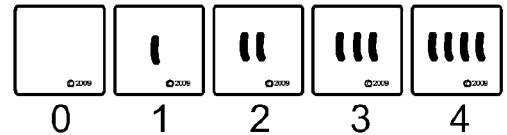
FIG. 10D illustrates a Tally Numeral chart for numbers 0 to 4.
Figure 10C:
FIG. 10C illustrates the back side of Colored Game Tiles.

FIG. 10A shows one complete set of 24 Game Tiles: six zero or blank tiles; six tally one tiles; and four each of tally two, three and four tiles. Each tile is approximately 1¾" W×1¾"L×¾H). There are three sets of 24 Game Tiles, each set with a unique color. In a preferred embodiment, the sets are tangerine-orange, violet-purple, and lime-green. FIG. 10B shows a Game Tile having recessed black tally numerals. FIG. 10C shows the back side of a colored Game Tile having a recessed black "WARIFU" name. FIG. 10D show a tally numeral chart for the numbers 0 to 4. FIG. 11E shows one set of three Scoring Tiles with black borders and recessed black "WARIFU" name on both sides. There are three sets of Scoring Tiles—one set in each color.

Figure 11A:
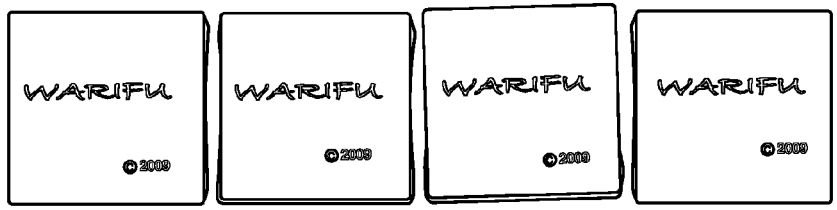
FIG. 11A illustrates Black Corner Tiles.
Figure 11B:
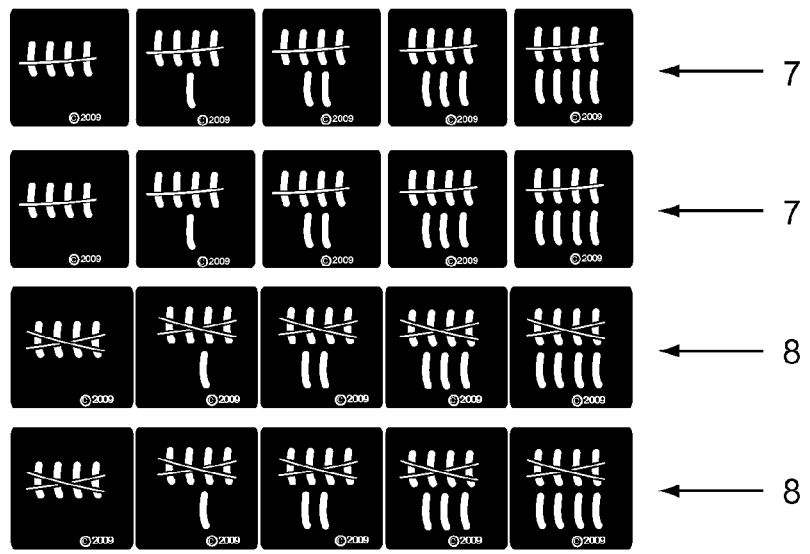
FIG. 11B illustrates Black Frame Tiles with white tally numerals recessed on the front side of each tile.
Figure 11C:
FIG. 11C illustrates the back side of Black Frame Tiles.
Figure 11D:
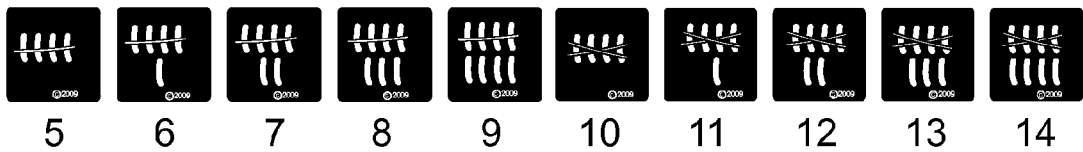
FIG. 11D illustrates a Tally Numeral Chart for numbers 5 to 14.

FIG. 11A shows the black Corner Tiles. FIG. 11B shows the Black Frame Tiles with recessed white tally numerals on one side. There are two sets of five black and white tiles with tally numerals "5" through "9" (a) and two sets of five black and white tiles with tally numerals "10" through "14" (b). FIG. 11C shows the back side of the Black Frame Tiles, and FIG. 11D is a tally numeral chart for the numbers "5" through "14".

Game Components Overview

WARIFU™ Game Components Include:

24 tangerine-orange, 24 violet-purple and 24 lime-green solid-colored plastic square Game tiles (FIG. 10A) with recessed tally numerals on the front side (FIG. 10) and recessed black WARIFU™ name on the back side (FIG. 10C).

Figure 10E:
FIG. 10E illustrates one set of three Scoring Tiles with black border.

Three tangerine-orange, three violet-purple and three lime-green Scoring Tiles with black borders and recessed black WARIFU™ game name on both sides of Scoring tiles (FIG. 10E).

Twenty black Frame tiles with recessed white tally numerals on the front side (FIG. 11B) and recessed white WARIFU™ name on the back side (FIG. 11C).

Four black Corner Tiles with recessed tri-color (FIG. 11-A) WARIFU™ name on both sides of tile (FIG. 12A).

One bamboo-slatted (or plastic slatted) black mat that unrolls to become a square flat sturdy game board (FIG. 8A, 8B) and rolls-up for compact storage (FIG. 8C).

One black rectangle bamboo (or premium deep density cardboard) box (FIG. 9A, 9C) with a lid that lifts off (FIG. 9B(4)) to reveal compartments to organize and store the colored game tiles (FIG. 9D(6)), the rolled-up game board mat (FIG. 9B(5)) and the game instruction sheet.

The black Game Board Mat comprises 17 one-inch wide bamboo slats (FIG. 8A) attached together by five black sturdy fabric runners running perpendicular to the slats and glued to the slats at evenly spaced points on the bottom side of each slat (FIG. 8B). The Game Board can also be made of black plastic slats attached together by five flexible wires naming perpendicular through the center of each slat and knotted to secure the slats together. The Game Board surface has a grid of 49 squares (FIG. 8A), outlined by small black and purple raised blocks (FIG. 2B) in a diamond pattern (FIG. 8A(c)) that dictate the placement of the square game tiles and prevent them from shifting during game play (FIGS. 2A, 3A).

Before game play begins, the 24 black tiles are placed on the perimeter squares of the game board grid as shown in FIG. 3A:

Four black Corner Tiles with the tricolor WARIFU™ name recessed on both sides (FIG. 11A) are placed on the corner perimeter squares (FIG. 2A).

Twenty Black Frame tiles (FIGS. 11B, 11C) with white recessed tally numerals (two each of tally numeral combinations of 5, 6, 7, 8, 9, 10, 11, 12, 13, and 14 on the front side and the white WARIFU™ name recessed on the back side) are placed between the corner perimeter squares (FIG. 2A, 3A) with the matching white tally numerals positioned at opposite ends of each row and column (FIGS. 3B, 3C).

The remaining 25 Center Squares (FIG. 2A) on the Game Board enclosed by the black tile border (FIG. 3A) creates 5 rows and 5 columns of 5 squares each and are where the players place their colored game tiles during game play. (FIG. 3A) WARIFU™ is played with two or three individual or pairs (team) of players. Each player or team selects one set of 24 tangerine-orange, violet-purple or lime-green Game tiles (FIG. 10A) and one set of three matching colored Scoring Tiles (FIG. 10E).

Unique Game Elements

Square Game Pieces with Tally Numerals

Square solid-colored plastic game pieces with recessed tally numerals (FIG. 10A).

The tally numerals can be interpreted and counted from all sides and angles of the game board.

Tally numerals are easily interpreted internationally by different cultures.

Square game pieces (1¾"W×1¾"L×½" H) are used as player Game Tiles (FIG. 10A), as Scoring tiles (FIG. 10E) and as part of the Game Board (FIGS. 3B, 11B).

Bamboo-Slatted Game Board Mat

The Game board is a bamboo-slatted (or plastic-slated) black mat (FIGS. 8A, 8B, 8C) that unrolls to lie flat during game play (FIG. 1C) and after game play rolls-up for compact storage (FIG. 1A) in the Game Box.

The Game Board and game tiles have no words or game play instructions attached; only tally marks (FIGS. 11B, 10A) and the WARIFU™ game name (FIGS. 11C, 10C, 10E) are on the game components.

The Game Board Grid border is outlined by small raised blocks to dictate placement of the Black and Colored Tiles and prevent them from shifting during game play (FIGS. 8A, 3A). The purple raised blocks on the perimeter of the Game Board Grid (FIGS. 8A, 3A) identify the placement of where the Black Frame Tiles are placed on the Game Board; the center black raised blocks identify the placement of where the Colored Game Tiles are placed during game play (FIG. 2B).

Interchangeable Black Frame Tiles allow players to adjust the skill level (FIGS. 5E, 5F, 5G) and create a new game board at the beginning of each new WARIFU™ game.

Adjustable Skill Level

The WARIFU™ game can be customized for beginner (FIG. 5E), intermediate (FIG. 5F) and advanced (FIG. 5G) player skill levels.

The location of the white tally numerals on the game board border impacts the ease of playability (FIGS. 5E, 5F, 5G).

The numeric combination of tally game tiles players use during game play impacts a player's game strategy and ease in winning a game (FIGS. 5A, 5B, 5C, 5D).

Game Appeal

WARIFU™ game name is Japanese for "tally".

WARIFU™ game uses the traditional Asian counting system of tally marks (FIG. 1B, 10D, 11D).

WARIFU™ game board is similar to a Japanese bamboo-slatted mat, providing a solid flat surface when open during game play and ability to be rolled-up for compact storage (FIGS. 1A. 1C).

WARIFU™ graphics and game components use traditional Japanese kimono colors; jet-black, snow-white, tangerine-orange, violet-purple, and lime-green.

WARIFU™ black bamboo game box reflects the shape and style of a Japanese treasure box (FIG. 9A, 9B, 9C, 9D).

Luck of the Draw

Players randomly draw game tiles, with the tally numeral hidden from view, from their shuffled pile of game tiles during game play.

Order of random draw of game tiles impacts a player's offense and defense game play strategy.

Players only have three game pieces with tally numerals exposed in their hand at one time to choose from during game play.

Minimal Game Play Skills Required

Simple counting and addition of tally numerals.

Vertical and horizontal tracking of numerals.

Sequential placement of same-color game pieces.

Tally Strategy

Game strategy constantly shifts between offense and defense, forcing players to choose between advancing their position on the game board and blocking their opponents ability to advance.

Each player uses an identical numeric combination of game tiles during game play (FIG. 5A, 5B, 5C, 5D).

Advanced player strategy includes tracking the tally numerals already in play by their opponents to identify the tally numerals not yet in play.

Player Flexibility

Game can be played with both an odd and even number of players—in combinations of 2 to 6.

Game can be played with diverse age group—adults with children.

Familiar Game Play Elements

Game objective includes placing five same-color game pieces in a sequential row or column.

Game play requires vertical and horizontal tracking of numerals.

Game strategy constantly shifts between offense and defense—forcing players to choose between advancing their position on the game board and blocking their opponent's ability to advance.

Game pieces are smooth—solid colored—plastic—game pieces similar to a Domino—but with a unique square shape and recessed tally numerals.

Glossary of WARIFU™ Game Terms

Tiles

TILES are square (1¾" w×1¾" d×½"h) solid-plastic game pieces used as part of the game board, a tool for game scoring and for game play. Their color and markings dictate their function. (FIGS. 4A-4F)

Corner Tiles

CORNER tiles are black tiles with the tri-color WARIFU™ name on both sides. They are placed pre-game on CORNER squares of the game board GRID. (FIG. 11A)

Frame Tiles

FRAME tiles are black & white tiles with white tally numerals and white WARIFU name. They are placed pre-game on the FRAME squares of the Game Board GRID. (FIG. 11B)

Game Tiles

GAME tiles are orange, purple and green colored TILES with black 0 to 4 tally numerals. Each player or team selects one set of GAME tiles to use during game play. (FIG. 10A)

Scoring Tiles

SCORING tiles are colored TILES with black borders and the black WARIFU™ name (FIG. 10E). To keep score, the winner of a WARIFU™ game places one of their SCORING tiles on a CORNER Square (FIG. 7A). For multiple wins, the SCORING tiles are stacked. (FIG. 7C)

WARIFU™ Game Champion

The first player to win three WARIFU games and hence have three same-colored SCORING tiles stacked on the game board, is the WARIFU™ Game Champion. (FIG. 7C)

Flat (of Tiles)

FLAT of tiles refers to a set of player's GAME tiles they draw from during game play. (FIG. 10A)

Pre-game, a player's FLAT is spread out (no stacking) on a smooth flat surface with the tally numeral side-down and WARIFU™ game name side-up (FIG. 4G). Each player mixes their FLAT by sliding the tiles around.

Stack (of Tiles)

STACK of tiles refers to a player's GAME tiles that have been removed from game play, by either "forfeiting a turn" or "penalty call", and stacked one on top of the other with the tally numeral side-up next to the player (FIG. 10B). The player with the least amount of STACK tiles is the first person to begin the FULL BOARD phase of game play.

Wall (of Tiles)

WALL of tiles refers to the three GAME Tiles a player randomly selects from their FLAT of same-color Game tiles. A WALL of tiles is when tiles are placed on-edge during game play, with the blank and tally numerals side of the tile only visible to the player (FIG. 4C).

Goal of Game

The goal of WARIFU™ is to place five same-color GAME tiles in a sequential row or column—and have their collective tally sum equal to the tally numeral on the black & white tiles that flank both ends of the sequential row or column (FIG. 7A).

Grid (of Squares)
GRID refers to the 49 squares outlined by small raised blocks on the Game Board (FIG. 8A). The GRID dictates placement of the black and colored tiles and prevents them from shifting during game play (FIG. 3A).

Corner Squares
CORNER squares are the four corner perimeter squares on the Game Board Grid (FIG. 2A). Black CORNER tiles (FIG. 4A) are placed on CORNER squares before game play. (FIG. 3A, 3B)

Frame Squares
FRAME squares are the 20 squares on the perimeter of the game board GRID, in between the CORNER squares (FIG. 2A). Black FRAME tiles are placed on the FRAME squares before game play (FIGS. 3B, 3C).

Center Squares
CENTER squares are the 25 squares enclosed by the FRAME squares (FIG. 2A). Colored GAME tiles (FIG. 10A) are placed on CENTER squares by players during game play (FIG. 3A).

Correct Move
CORRECT MOVE is when a player places a GAME tile on a CENTER square, and the collective tally sum of all GAME tiles in the intersecting row or column, is equal to or less than the white tally numeral that flanks both ends of the intersecting row or column. (FIG. 6B)

Incorrect Move
INCORRECT MOVE is when a player places a GAME tile on a CENTER square, and the collective tally sum of all GAME tiles in the intersecting row or column, exceeds the white tally numeral that flanks both ends of the intersecting row or column. (FIG. 6A)

Winning Move
WINNING MOVE is when a player places five sequential same-color GAME tiles in a row or column, and the collective tally sum of all GAME tiles in the intersecting row or column, equals the white tally numeral that flanks both ends of the intersecting row or column. (FIG. 7A)

Empty Board Move Rule
EMPTY BOARD MOVE RULE applies when there are one or more empty CENTER squares on the game board. (FIG. 6C)
EMPTY BOARD MOVE is when a player places a GAME tile on an empty CENTER square. CORRECT MOVE game rules apply.
If no empty CENTER squares exist on the game board—and all squares are filled with GAME tiles—game play automatically switches to FULL BOARD MOVE RULE game rules (FIG. 6D).

Full Board Move Rule
FULL BOARD MOVE RULE game rules apply when there are no more empty CENTER squares on the game board. (FIG. 6D)
When the last CENTER square is filled with a GAME tile, and there are no more empty Center squares, the order of game play is altered, and the rule for placing tiles on the game board is changed.
The player with the least amount of tiles in their STACK of Tiles (FIG. 4D) is the first person to start FULL BOARD MOVE. If there is a tie, the player to the right of the player who started the initial board game, is the first player to start FULL BOARD MOVE.
FULL BOARD MOVE is when a player removes an opponents GAME tile from one of the CENTER squares—and replaces it with one of their own GAME tiles (FIG. 6D). All other standard game rules apply.

WARIFU™ Game Rules:
Object of Game
The WARIFU™ game objective is to place five same-color GAME tiles in a sequential row or column, and have the collective tally sum of all five tiles equal to the white tally numeral on the black tile that flanks both ends of the row or column as shown in FIG. 7A.

Winner of Game
The winner of the WARIFU™ game is the first player or team to make a WINNING MOVE (FIG. 7A) and place five same-color GAME tiles in a sequential row or column, and have the collective tally sum of all 5 tiles equal to the tally numeral on the FRAME tile that flanks both ends of the sequential row or column (FIG. 7A).

WARIFU™ Champion
The first player or team to win three WARIFU™ games is the WARIFU™ CHAMPION.

Correct Move
CORRECT MOVE (FIG. 6B) is when a player places a GAME tile on a CENTER square and the collective tally sum of all GAME tiles in both the intersecting row and column (FIG. 6B) is equal to or less than, the tally numeral on the FRAME tile that flanks both ends of the intersecting row and column (FIG. 6B).

Incorrect Move
INCORRECT MOVE (FIG. 6A) is when a player places a GAME tile on a CENTER square, and the collective tally sum of all GAME tiles in both the intersecting row and column exceeds the tally numeral on the FRAME tile that flanks both ends of the intersecting row and column. Players may not make an INCORRECT MOVE during game play.

Empty Board vs Full Board
During EMPTY BOARD (FIG. 6C) game play, players take turns placing one of their GAME tiles on an empty CENTER square (FIG. 6C) on the game board.
When all CENTER squares are filled with GAME tiles, players switch to FULL BOARD MOVE (FIG. 2A) game play.
The player with the least number of tiles in their STACK of tiles (FIG. 4D) begins the FULL BOARD game play phase (FIG. 6D).
During FULL BOARD MOVE (FIG. 6D) game play, players remove one of the opponents colored GAME tiles (FIG. 6D-a) from the Game Board and replace it with one of their own colored GAME tiles (FIG. 6D-b).

Forfeit Turn
Players automatically forfeit their turn if they cannot make a CORRECT MOVE (FIG. 6B).
Players have the option of forfeiting their turn if it is to their strategic game play advantage to not take a turn.
To forfeit a turn: players discard one Game tile from his/her WALL of tiles (FIG. 4C) and place the removed Game tile with tally numeral side-up in their STACK of tiles (FIG. 4D). The player then randomly selects a new Game tile from his/her FLAT of tiles (FIG. 4G) and adds the Game tile to his/her WALL of tiles (FIG. 4C).

Penalty Call
If an opponent catches a player making an INCORRECT MOVE (FIG. 6A-a), then the player's GAME tile is automatically removed from the game board and placed in the player's STACK of same-color tiles (FIG. 4D), with no option for game play correction. Players resume game play with the order of play unaltered.
If a row or column is discovered by a player(s) to have an INCORRECT MOVE (FIG. 6A) and the perpetrator is unknown, the whole row or column of GAME tiles is automatically removed from the Game Board and placed in their respective player's STACK of same-color tiles (FIG. 4D) with no option for game play correction. The player who discovered the INCORRECT MOVE is the first player to take a turn when game play resumes.

WARIFU™ Game Play Instructions

1: Game Preparation

Remove the game board (FIG. 1A (3)) and game tiles (FIG. 1A(2)) from the WARIFU™ game box (FIG. 1A) and place on a smooth, flat table surface.

2: Select Order of Play

WARIFU™ can be played with an even or odd number of players—in combinations of 2 to 3 players or teams (pairs).

2 or 3 individual players sit evenly spaced around the game board in order of play.

For teams, one player from each team sits around the game board in order of play, then the second player from each team in identical order of play sits clockwise after the first players.

3: Select Player Who Begins the Game

One FLAT (set) of colored GAME tiles (FIG. 4G) is placed numeral side down on a flat surface and mixed around by a player.

Each player randomly selects a GAME tile from the FLAT of tiles and turns it over.

The player with the highest tally numeral is selected to start the first WARIFU™ game, with the person seated clockwise from the first player going second, and so on. If there is a tie, all players randomly select another tile from the FLAT of tiles, and so on.

4: Select Game Tiles

The person who is selected to begin the WARIFU™ game is the first player to select a tangerine-orange, violet-purple or lime-green set of GAME tiles (FIG. 10A) for game play.

Moving clockwise, the next player selects a set of Game tiles, and so on.

For teams, one player from each team is responsible for selecting the teams set of colored Game tiles.

5: Select Level of Game Strategy

The numeric combination of GAME tiles players use during game play impacts a player's game strategy and ease in winning a game.

Refer to GAME TILE CHARTS (FIGS. 5A-5D) to select level of game strategy; easy, challenging, difficult or complex.

The person who is selected to begin the WARIFU™ game must choose the level of game play; easy (FIG. 5A), challenging (FIG. 5B), difficult (FIG. 5C) or complex (FIG. 5D).

Once the level of play is selected, the combination of Game tiles in each set is adjusted accordingly. Game tiles removed from the set of tiles are stored in the Game Box during Game play.

6: Dividing and Mixing the Flat of Tiles

Each set of Game tiles to be used during game play is spread out (no stacking) on the game table, with the tally numeral side-down and the WARIFU™ name side-up, to create a FLAT of tiles (FIG. 4G).

The opponent seated clockwise from each player is responsible for mixing the player's FLAT of tiles, by sliding the tiles around using fingers.

For teams, one player from each team is designated to mix an opponent's FLAT of tiles.

After mixing the FLAT of tiles, players position the FLAT of tiles next to their position at the game board table. For teams, the FLAT of tiles is randomly divided into two equal FLATS of Game tiles, and one-half of each FLAT of tiles is given to each player on the team.

7: Set-Up Game Board

Unroll the game board in the middle of the game play surface.

8: Place Corner Tiles on Game Board

Place the 4 black CORNER tiles (FIG. 4A) on the four CORNER FRAME squares (FIG. 7C).

9: Select Level of Play

The WARIFU™ game can be customized for beginner (FIG. 5E), intermediate (FIG. 5F) and advanced (FIG. 5G) player skill levels. The location of the white tally numerals on the black Frame tiles on the perimeter of the game board impacts the ease of playability.

Black Frame tiles with matching white tally numerals must be placed on Frame squares at opposite ends of each row and column (FIGS. 3B, 3C).

Refer to the Frame Tile Chart to select level of game play: beginner (5E), intermediate (5F), and advanced (5G).

10: Sort the Frame Tiles by Tally Numeral

There are 20 black Frame tiles, two each with tally numerals 5, 6, 7, 8, 9, 10, 11, 12, 13 and 14 (FIG. 12-B). To decipher the tally numerals, refer to the TALLY NUMERAL CHART (FIG. 11D).

Separate the 20 black FRAME tiles into two groups:
FRAME tiles with tally numeral 5 (FIG. 11B(7))
FRAME tiles with tally numeral 10 (FIG. 11B(8))
Stack pairs of matching tiles and place in numeric order.

11: Place Frame Tiles on Game Board

The player chosen to start the WARIFU™ game is responsible for selecting the Frame Tile placement and the level of game play from the Frame Tile Chart.

Use the designated FRAME TILE CHART (FIG. 5E, 5F, or 5E) in placing the FRAME tiles (FIG. 11B) on the Frame squares (FIG. 5B).

Seasoned WARIFU™ players have the option of not using the WARIFU™ Frame Tile Chart and placing the FRAME tiles in any combination on the Frame squares, as long as matching white tally numerals are at opposite ends of each row and column (FIGS. 3B, 3C).

Matching tally numerals are always placed at opposite ends of the game board GRID from each other.

Orientation of the white tally marks on the black Frame tiles must be consistent and be all vertical or all horizontal in placement on their game board (FIGS. 3B, 3C).

12: Review Game Rules and Glossary

Before game play begins, players should review the GLOSSARY OF WARIFU™ TERMS (see Glossary of WARIFU™ Terms) and GAME RULES (see Game Rules).

13: First Player Starts the Game

First player randomly selects three GAME tiles (FIG. 4F) from his/her FLAT of tiles (FIG. 4G).

Using the three selected Game tiles, the player creates a WALL of tiles (FIG. 4C) with the tally numeral side only visible to the player.

Player selects one GAME tile from his/her WALL of tiles and places it on one empty CENTER square on the game board (FIG. 5A) with the orientation of the black tally mark on the colored GAME tile (FIG. 4F) matching the orientation of the white tally mark on the black Frame tiles (FIGS. 3C, FIG. 3D) on the Game Board (FIG. 6C).

GAME tiles must be placed on a CORRECT square on the game board, as described in CORRECT MOVE (FIG. 6B).

After players complete their turn, they randomly select one tile from their FLAT of tiles and add it to their WALL of tiles.

During game play a player always has three exposed tally numerals to choose from.

14: Second Player Takes a Turn
The player seated clockwise from the first player who started the game, is the second player to take a turn.
Second player follows game play instructions listed above in FIRST PLAYER #13.
Player seated clockwise to the second player repeats, and so on, moving clockwise around the game table.
For pairs of players called Teams, one player from each team takes a turn, then moving clockwise around the table, die second player from each team takes a turn in the same sequential order.

15: Empty Board vs Full Board Move
If there are one or more empty CENTER squares on the game board, EMPTY BOARD MOVE game rules apply (FIG. 6C).
Players take turns placing one GAME tile on one empty CENTER square.
If no empty CENTER squares exist on the game board, FULL BOARD MOVE (FIG. 6D) game rules apply.
  The player with the least amount of Game tiles in his/her STACK of tiles (FIG. 4D) is the first person to start FULL BOARD MOVE (FIG. 6D) game play.
  Players take turns removing an opponent's colored GAME tile from one of the CENTER squares (FIG. 6D(a)), and replacing it with one of their own colored GAME tiles (FIG. 6D(b), 6D(c) from their WALL of tiles (FIG. 4C).

16: Correct vs Incorrect Move
CORRECT MOVE is when a player places a GAME tile on a CENTER square (FIG. 6B(a)) and the collective tally sum of all GAME tiles in both the intersecting row (FIG. 6B(c)) and column (FIG. 6B(b)) is equal to or less than, the tally numeral on the black FRAME tile that flanks both ends of the intersecting row (FIG. 6B(e)) and column (FIG. 6B(d)).
INCORRECT MOVE is when a player places a GAME tile on a CENTER square (FIG. 6A(a)) and the collective tally sum of all GAME tiles in both the intersecting row (FIG. 6A(e)) and column (FIG. 6A(b)) exceeds the tally numeral on the FRAME tile that flanks both ends of the intersecting row (FIG. 6A(f)) and column (FIG. 6A(c)). INCORRECT MOVE is not allowed during game play.

17: Forfeit Turn
Players automatically forfeit their turn if they cannot make a CORRECT MOVE (FIG. 6B).
Players have the option of forfeiting their turn if it is to their strategic game play advantage to not take a turn.
To forfeit a turn: players discard one Game tile from his/her WALL of tiles (FIG. 4C) and place the removed Game tile with tally numeral side-up in their STACK of tiles (FIG. 4D). The player then randomly selects a new Game tile from his/her FLAT of tiles (FIG. 4G) and adds the Game tile to his/her WALL of tiles (FIG. 4C).

18: Penalty Call
If an opponent catches a player making an INCORRECT MOVE (FIG. 6A), then the player's GAME tile is automatically removed from the game board and placed in the player's STACK of same-color tiles (FIG. 4D), with no option for game play correction. Players resume game play with the order of play unaltered.
If a row or column is discovered by a player(s) to have an INCORRECT MOVE (FIG. 6A) and the perpetrator is unknown, the whole row or column of GAME tiles is automatically removed from the Game Board and placed in their respective player's STACK of same-color tiles (FIG. 4D) with no option for game play correction. The player who discovered the INCORRECT MOVE is the first player to take a turn when game play resumes.

19: Winner of Game
The winner of the WARIFU™ game is the first player or team to complete a Winning Move (FIG. 7A).
The winner of the WARIFU™ game places one SCORING tile (FIG. 4B) that matches the color of his/her Flat of tiles (FIG. 4C) on one black CORNER tile (FIG. 7C(a)) on the game board (FIG. 7C(b)). Each player/team designates one of the 4 Corner Tiles on the Game board as the location to place their player/team. Scoring Tiles.
With each additional win, players pile their same-color SCORING tiles one on top of the other on the designated Corner tile (FIG. 7C(c)).

20: WARIFU™ Champion
The first player or team to win three WARIFU™ games is the WARIFU™ CHAMPION (FIG. 7C(c)).

21: Begin New WARIFU™ Game
The person seated clockwise from the player who started the first game begins the second WARIFU™ game.
The player who starts the second game has the option of changing the placement of Frame tiles using the FRAME TILE CHART (FIGS. 5E, 5F, 5G) and combination of player Game Tiles using the GAME TILE CHART (FIG. 5A-5D).
Repeat for all new WARIFU™ games.

WARIFU™ Game Box
Description:
Rectangle WARIFU™ Game Box reflects the shape and style of a Japanese treasure box. (FIG. 9A)
Bamboo-wood or premium deep density cardboard box (FIG. 9A) with overhanging lid (FIG. 9C) that lifts off (FIG. 9D(4)) to reveal the base of game box with compartments to store game components (FIG. 9D(6)).
Eight interior compartments (2" W×4¾" L) at base of game box organizes and stores the WARIFU™ game pieces (FIG. 9D(6)).
Sturdy plastic-slatted black WARIFU™ game board is rolled-up and stored on top of WARIFU™ game pieces inside box (FIG. 9B(5)).

Preferred Game Box Specifications:
Bamboo-wood Box Lid Exterior Dimensions: 18½" L×6¼" W×2¾" H (Box Lid Interior: 18" L×5¾" W×2½" H)
Bamboo-Wood Box Base Exterior Dimensions: 17¾" L×5½" W×3" H (Box Base Interior: 17¼" L×5¼" H×2¾" H)
Bamboo-Wood Closed Box Dimensions: 18½" L×6¼" W×4" H WARIFU™ Game Board
Description:
Square bamboo-slated (FIG. 8A) or plastic-slated black mat that lays flat during game play (FIG. 1C) and can be rolled-up for compact storage (FIG. 1A(c)).
The 17 bamboo-slats are attached together to make a smooth playing surface by five black strips of sturdy fabric evenly spaced, running perpendicular to the slats, and glued to the underside of the slats (FIG. 8B).
The 17 plastic-slats are attached together by five flexible wires running perpendicular through the center of the slats and secured with a knot at opposite ends.
The game board surface has a grid of 49 squares (FIG. 8A) with the Frame and Corner squares (FIGS. 5A, 5B) outlined by small purple raised blocks (FIG. 8A(a)) and the Center squares (FIG. 5C) outlined by black raised blocks.
The grid is placed in a diamond pattern (FIG. 8A(e)) making it easier for players to pick up their square game tiles (FIG. 8A(d)) from its side.

The Game Board Grid dictates placement of the game pieces and prevents them from shifting during game play (FIG. 7A).

Preferred Game Board Specifications

Square Game Board: (FIG. 8A) 17" L×17 W×3/16" D
Game Board Slat: 17" L×1" W×3/16" D
Total Slats: 17
Game Board Rolled-Up: (FIG. 8C) 17" L×4¾" W×1½" H
Game Board Grid: (FIG. 8A.) The raised blocks are centered on each slat and spaced 1" wide in both directions. It creates a 47 diamond-shaped grid that secures the 1¾" square game piece in place. Extra purple blocks are placed to highlight the four perimeter corners and perimeter squares to help identity the location of the Frame tiles.

Black WARIFU™ Game Pieces

Description:

Square, two-sided, solid-colored, plastic game tiles with recessed tally numerals and text (FIGS. 11A-11C).
Twenty Black Frame Tiles with recessed white tally numerals on the front side (FIG. 11B) and recessed white WARIFU™ name on the back side (FIG. 11C).
Four Black Corner Tiles with recessed tri-color WARIFU™ name on both sides of tile (FIG. 11A).

Game Piece Specifications

Shape: Square—1¾" W×1¾" L×¾" H
Material: solid molded plastic
Weight: similar to a domino
Solid Game Piece Colors: black Colored WARIFU™ Game Pieces Description:

Square, two-sided, solid-colored, plastic game tiles with recessed tally numerals and text.
24 tangerine-orange, 24 violet-purple and 24 lime-green solid-colored plastic square Game tiles (FIG. 10A) with six blank, six tally #1, four tally #2, four tally #3, and four tally #4 recessed tally numerals on the front side (FIG. 10B), and all tiles having recessed black WARIFU™ name on the back side (FIG. 10C).
3 tangerine-orange, 3 violet-purple and 3 lime-green Scoring Tiles with black borders and recessed black WARIFU™ game name on both sides of Scoring tiles (FIG. 10E).

Game Piece Specifications

Shape: square—1¾" W×1¾" L×¾" H
Material: solid molded plastic
Weight: similar to a domino
Solid Game Piece Colors:
  Tangerine orange
  Lime green
  Violet purple As noted above, the present game may be implemented as a computer software game for play on electronic and computer apparatuses. Specifically, the described physical game pieces may be simulated in software for play and viewing on an electronic display screen (LCD, LED, CRT, etc.) just as the physical embodiment is played. The game may be played on a single device, or via a network and/or wireless connection to allow multiple parties to play each other over the network and/or wireless connection.

Portions of the present invention may be conveniently implemented using a conventional general purpose or a specialized digital computer or microprocessor programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, CD or DVD RW+/−, microdrive, and magneto-optical disks, ROMs, RAMs, EPROMs, EEPROMs, DRAMs, VRAMs, flash memory devices (including flash cards, memory sticks), magnetic or optical cards, SIM cards, RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, creating the game board and game pieces, and providing a play environment equivalent to the physical game.

In one embodiment, the present invention or portions of the present invention operate on a processing device in a portable electronic device, such as a hand held game device, cell phone, or PDA. In one embodiment, steps of the invention or portions of the invention are embodied in processor readable code on a SIM card that may be installed in a card slot in the portable electronic device. The SIM card comprises, for example, a set of computer readable instructions that, when loaded into a processor of a portable device, cause the processor to perform the steps of creating the game board and game pieces, and providing a play environment Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A game implemented on a gaming machine, comprising:
   a game board having a plurality of playing squares arranged in rows and columns, the game board further comprising:
      a Frame Square at both ends of each row and column; and
      each Frame Square comprising an indicia of a numeral, such that a Frame Square located on a first end of a row has a same indicia of a numeral as a Frame Square located on an opposite end of the row, and wherein a Frame Square located on a first end of a column has a same indicia of a numeral as a Frame Square located on an opposite end of the column, and wherein the Frame Squares are not in a numeric order;

a plurality of Game Tile sets, each Game Tile comprising an indicia of a numeral, and each player having a set of Game Tiles;

wherein each player places a Game Tile from his/her set in one of the playing squares on the game board with the goal that the player's Games Tiles fill every playing square in a row or column, and a sum of the indicia of numerals on the player's own Game Tiles in either a row or column equals the indicia of a numeral on a Frame Square at an end of either the row or column;

wherein the game is implemented in software for execution on a microprocessor of the gaming machine to simulate the physical play of the game board and game pieces and display the game on a display screen of the gaming machine.

2. A game implemented on a gaming machine, comprising:
a game board comprising:
   49 squares arranged in 7 rows and 7 columns, with four Corner Squares, 20 Frame Squares on a perimeter of the game board, and 25 Center Squares; and
   an indicia of a numeral from 5 to 14, inclusive, on each Frame Square such that a Frame Square located on a first end of a row has a same indicia of a numeral as a Frame Square located on an opposite end of the row, and wherein a Frame Square located on a first end of a column has a same indicia of a numeral as a Frame Square located on an opposite end of the column;
four Corner Tiles, each Corner Tile located on one Corner Square;
a plurality of Game Tiles, each Game Tile comprising an indicia of a numeral from 0 to 4, inclusive, and each player having a set of Game Tiles;
wherein each player places a Game Tile in one of the center playing squares on the game board in a manner such that a sum of the indicia of numerals on the player's own Game Tiles in either a row or column equals or is less than the indicia of a numeral on a Frame Square at an end of either the row or column;
wherein the game is implemented in software for execution on a microprocessor of the gaming machine to simulate the physical play of the game board and game pieces and display the game on a display screen of the gaming machine.

3. A method of playing a board game implemented on a gaming machine, the game board comprising M rows and N columns, the method comprising:
   placing a Corner Tile at each of four corners of the game board;
   placing a Frame Tile, the Frame Tile having an indicia of a numeral, on a first end of each of the second through M−1 rows;
   placing a Frame Tile on a second end of each of the second through M−1 rows, wherein the indicia of a numeral on the Frame Tile for each second end of each row matches the indicia of a numeral on each of the respective Frame Tiles on the first end of each of the second through M−1 rows;
   placing a Frame Tile, the Frame Tile having an indicia of a numeral, on a first end of each of the second through N−1 columns;
   placing a Frame Tile on a second end of each of the second through sixth rows, wherein the indicia of a numeral on the Frame Tile for each second end of each row matches the indicia of a numeral on each of the respective Frame Tiles on the first end of each of the second through N−1 columns;
   assigning a unique set of Game Tiles to each player or team of a group of at least two players or teams;
   each player or team in turn placing a Game Tile from the unique set on a playing square, each playing square comprising a space in rows two through M−1 and columns two through N−1, each Game Tile having an indicia of a numeral; and
   each player or team continuing in turn to place Games Tiles on playing squares until one player or team has placed its respective Game Tiles completely filing the playing squares on any row or column, such that a sum of the indicia of the numbers on the Game tiles in the playing squares matches the indicia of a numeral on the Frame Tiles located at either end of the row or column;
   wherein the method is implemented in software for execution on a microprocessor of the gaming machine to simulate the physical play of the game board and game pieces and display the game on a display screen of the gaming machine.

4. A non-transitory computer readable media comprising computer code for playing an electronic game, wherein the computer code is executed by a processor of an electronic gaming device, the computer readable medium comprising:
   computer code for forming a game board having a plurality of playing squares arranged in rows and columns;
   computer code for creating a plurality of Frame Tiles, wherein a Frame Tile is placed on at least one end of each row and each column, each Frame Tile comprising an indicia of a numeral;
   computer code for creating a plurality of Game Tile sets, each Game Tile comprising an indicia of a numeral, and each player having a set of Game Tiles; and
   computer code to allow each player to place a Game Tile from his/her set in one of the playing squares on the game board with the goal that the player's Games Tiles fill every playing square in a row or column, and a sum of the indicia of numerals on the player's own Game Tiles in either a row or column equals the indicia of a numeral on a Frame Tile at an end of either the row or column.

5. An electronic game system for playing an electronic game, the system comprising:
   a processor for executing program code instructions;
   a computer readable medium storing computer code instructions, the computer code instructions comprising:
   computer code instructions for forming a game board having a plurality of playing squares arranged in rows and columns;
   computer code instructions for creating a plurality of Frame Tiles, wherein a Frame Tile is placed on at least one end of each row and each column, each Frame Tile comprising an indicia of a numeral;
   computer code instructions for creating a plurality of Game Tile sets, each Game Tile comprising an indicia of a numeral, and each player having a set of Game Tiles; and
   computer code instructions to allow each player to place a Game Tile from his/her set in one of the playing squares on the game board with the goal that the player's Games Tiles fill every playing square in a row or column, and a sum of the indicia of numerals on the player's own Game Tiles in either a row or column equals the indicia of a numeral on a Frame Tile at an end of either the row or column.

6. An electronic game system for playing an electronic board game, the game board comprising M rows and N columns, the system comprising:

a processor for executing program code instructions;

a computer readable medium storing computer code instructions, the computer code instructions comprising:

computer code instructions for placing a Corner Tile at each of four corners of the game board;

computer code instructions for placing a Frame Tile, the Frame Tile having an indicia of a numeral, on a first end of each of the second through M−1 rows;

computer code instructions for placing a Frame Tile on a second end of each of the second through M−1 rows, wherein the indicia of a numeral on the Frame Tile for each second end of each row matches the indicia of a numeral on each of the respective Frame Tiles on the first end of each of the second through M−1 rows;

computer code instructions for placing a Frame Tile, the Frame Tile having an indicia of a numeral, on a first end of each of the second through N−1 columns;

computer code instructions for placing a Frame Tile on a second end of each of the second through sixth rows, wherein the indicia of a numeral on the Frame Tile for each second end of each row matches the indicia of a numeral on each of the respective Frame Tiles on the first end of each of the second through N−1 columns;

computer code instructions for assigning a unique set of Game Tiles to each player or team of a group of at least two players or teams;

wherein each player or team in turn placing a Game Tile from the unique set on a playing square, each playing square comprising a space in rows two through M−1 and columns two through N−1, each Game Tile having an indicia of a numeral; and wherein each player or team continuing in turn to place Games Tiles on playing squares until one player or team has placed its respective Game Tiles completely filing the playing squares on any row or column, such that a sum of the indicia of the numbers on the Game tiles in the playing squares matches the indicia of a numeral on the Frame Tiles located at either end of the row or column.

\* \* \* \* \*